United States Patent [19]

Siefert et al.

[11] Patent Number: 5,346,627
[45] Date of Patent: * Sep. 13, 1994

[54] METHOD FOR REMOVING METALS FROM A FLUID STREAM

[75] Inventors: Kristine S. Siefert, Crete; Pek L. Choo, Naperville; John W. Sparapany, Bolingbrook; John H. Collins, Bloomingdale, all of Ill.

[73] Assignee: Nalco Chemical Company, Naperville, Ill.

[*] Notice: The portion of the term of this patent subsequent to Nov. 17, 2009 has been disclaimed.

[21] Appl. No.: 123,805

[22] Filed: Sep. 20, 1993

Related U.S. Application Data

[60] Continuation-in-part of Ser. No. 923,653, Aug. 3, 1992, abandoned, which is a division of Ser. No. 845,870, Mar. 3, 1992, Pat. No. 5,164,095.

[51] Int. Cl.$^5$ ................................ C02F 1/62
[52] U.S. Cl. .................... 210/729; 210/735; 210/736; 210/912; 210/914
[58] Field of Search ............ 210/732, 735, 736, 912, 210/913, 702, 729, 914; 528/373, 387; 525/540; 252/175, 180

[56] References Cited

U.S. PATENT DOCUMENTS

| | | | |
|---|---|---|---|
| 3,372,129 | 3/1968 | Phillips | 210/736 |
| 3,839,215 | 10/1974 | Mulders | 210/735 |
| 3,893,916 | 7/1975 | Argabright et al. | 210/735 |
| 3,932,274 | 1/1976 | Izumi et al. | 210/735 |
| 4,054,516 | 10/1977 | Izumi et al. | 210/736 |
| 4,518,760 | 5/1985 | Smith et al. | |
| 4,537,937 | 8/1985 | Cawlfield et al. | |
| 4,629,570 | 12/1986 | Kennedy, Jr. | |
| 4,670,160 | 6/1987 | Moriya et al. | 210/728 |
| 4,678,844 | 7/1987 | Sakuragi et al. | |
| 4,731,187 | 3/1988 | Moriya et al. | 210/719 |
| 5,013,451 | 5/1991 | Thompson et al. | 210/735 |
| 5,019,274 | 5/1991 | Thompson et al. | 210/735 |
| 5,026,483 | 6/1991 | Thompson et al. | 210/735 |

Primary Examiner—Neil McCarthy
Attorney, Agent, or Firm—Hill, Steadman & Simpson

[57] ABSTRACT

A method is provided for removing metals from a fluid stream containing these metals. The method involves treating the fluid stream with a water soluble ethylene dichloride ammonia polymer having a molecular weight of from 500 to 100,000 that contains at least 5 mole percent of dithiocarbamate salt groups to form a complex with the metals. Then, the fluid stream is passed through a filtering device to remove the complexes from the fluid stream.

23 Claims, No Drawings

METHOD FOR REMOVING METALS FROM A FLUID STREAM

This is a continuation-in-part of U.S. Ser. No. 07/923,653 filed Aug. 3, 1992 now abandoned which is a divisional of U.S. Ser. No. 07/845,870, now U.S. Pat. No. 5,164,095.

BACKGROUND OF THE INVENTION

The present invention relates to water soluble dithiocarbamate salt polymers and their use in a metal scavenging process. More particularly, the present invention provides a method for removing metals from a fluid stream to below detection limits with the use of a polymeric dithiocarbamate.

As more problems are caused by contamination of rivers, waterways and the like by waste water from industrial sources, stricter regulations have been enacted to avoid contamination. For instance, a mandatory requirement exists to control metals in waste water below their prescribed concentrations. Particularly stringent regulations have been established for metals harmful to humans, such as mercury, cadmium, zinc, copper, lead, nickel and silver. For example, regulatory agencies have introduced stringent lead standards, resulting in a demand for new treatments that are able to remove lead to extremely low levels (<0.1 ppm in many cases).

Various processes have been proposed to remove metal ions in waste water. In one process, metal removal is achieved using simple sodium salts of dialkyl dithiocarbamates (e.g. sodium dimethyldithiocarbamate, DMDTC). Several drawbacks exist in using low molecular weight dithiocarbamates. The precipitate formed can be small and settling or filtering of the precipitate from the waste water can be slow.

Moreover, current chemical treatments, such as diakyldithiocarbamates, require the separate addition of flocculants and/or coagulants for subsequent separation of metal-bearing precipitate from effluent water. In treating dilute rinse waters having low concentrations of metals, say below 50 ppm, the resulting metal-DTC complexes form colloidal particles in suspension; i.e., particles that will not settle in a reasonable time period. In some waste waters, these particles are so small that they appear only as color, carrying metal ions into the effluent. Thus, sufficient removal of the metal ions from the plant effluent necessitates the practice of appropriate coagulation/flocculation techniques for colloidal suspensions.

This coagulation/flocculation step is extremely difficult to optimize. Several characteristics of waste water systems, such as waste waters from metal plating operations in metal fabricating shops and printed wiring board manufacturing, makes the aggregation of metal-DTC particles especially problematic. Numerous dispersants are present from periodic sewering of chemicals such as cleaners, dissolved, photo-resistive masking agents, spent developer, soluble oils, and solder strip. These dispersants inhibit the aggregation of particles, increasing the dosage requirement for coagulant and sometimes, flocculent. Due to the changing concentration of these dispersants over time, coagulant dosage requires frequent adjustments, which are not made often enough to optimize the coagulation/flocculation step.

Additionally, the coagulation/flocculation step often precludes the ability to achieve low limits for metal discharge because of inadequate separation of the metal-bearing precipitate. In many cases, when the initial metal concentrations are low, say below 5 ppm, the current DTC chemicals are unable to polish the metal levels to below effluent discharge limits, typically at 50–500 ppb.

One proposal for improving the ability of dithiocarbamates to remove metals is to react carbon disulfide with polyethyleneimine polymers. Such a proposal is set forth in European Patent Application 0 090 551 A1. The polyethyleneimine dithiocarbamate polymers described in this patent are water insoluble. While evidencing the ability to chelate undesirable metals, the separation of the chelated metal polymer complex is relatively slow. The action of these materials is believed to be similar to the action of water insoluble ion exchange resins.

Another example of polyethyleneimine-dithiocarbamate polymers is set forth in U.S. Pat. No. 4,670,160. In Example 8 of the '160 patent, a polyethyleneimine resin having molecular weight of 60,000 was modified with carbon disulfide. The finished resin, while evidencing some water solubility, contained substantial quantities of insoluble materials.

Still another problem with prior processes has been the inability to readily collect the resulting precipitate. In some waste water systems, flow rates are so rapid that the precipitate within the waste water is not able to settle. In addition, some systems have no retention time and no site within the system in which the precipitate may settle. Still further, some solids in the water system are so small in diameter that they are nonsettleable.

As will be shown hereafter, the polymeric dithiocarbamate polymers of this invention are water soluble, have the ability to readily complex undesirable metals that are easily removable from aqueous solutions. Moreover, the method of the present invention assures the collection of all formed metal complexes, regardless of the flow rate.

SUMMARY OF THE INVENTION

The present invention provides a method for removing monovalent and divalent metals from a fluid stream is treated with a water soluble ethylene dichloride ammonia polymer having a molecular weight of from 500 to 100,000 that contains from 5 to 50 mole percent of dithiocarbamate salt groups. Treating the fluid stream with the water soluble ethylene dichloride ammonia polymer forms a complex with the monovalent and divalent metals. Then, the fluid stream is passed through a filtering device to remove the complexes from the fluid stream In an embodiment monovalent and divalent metals, such as copper, nickel, zinc, lead, mercury, cadmium, silver, iron, manganese, palladium, and platinum are removed from the fluid stream.

In an embodiment, the method includes an additional step of allowing at least a majority of the complexes to settle from the fluid stream as a precipitate prior to passing the fluid stream through the filtering device.

In an embodiment, the method includes an additional step of adjusting the pH of the fluid stream to between 4.0 and 12 prior to treating same with the modified polymer of the present invention.

An advantage of the present invention is that the polymeric dithiocarbamates can precipitate metals from waste water and form visible floc faster than DMDTC.

Another advantage of the present invention is that in addition to good chelation ability of the polymeric dithiocarbamates, the precipitate formed is larger than that produced by DMDTC, and settles very quickly.

Yet another advantage of the present invention is that because the precipitate is large, little need exists for coagulants or flocculants to aid in settling. Therefore, the polymeric dithiocarbamate of this invention can be a one product, one-step treatment chemical for removing monovalent and divalent metals from waste waters.

Moreover, an advantage of the present invention is that it allows the collection of formed complexes in fluid systems where such complexes are not able to settle as precipitate. Passing the formed complexes through a suitable filtering device removes the need for settling tanks.

Still another advantage of the present invention is that it eliminates high capital investment in equipment, unlike other methods of metal removal such as ion exchange.

Another advantage of the present invention is the modified polymer flocculates the resulting metal complex and eliminates the problem of optimizing coagulant feed and ineffective metal removal.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides a method for removing monovalent and divalent metals from a fluid stream to below detection levels with the use of polymeric dithiocarbamate. The polymeric dithiocarbamate comprises a water soluble ethylene dichloride ammonia polymer having a molecular weight of from 500 to 10,000 that contains from 5 to 50 mole percent of dithiocarbamate salt groups.

The ethylene dichloride ammonia polymers are prepared by the reaction of ethylene dichloride and ammonia. A typical reaction for producing these polymers will be illustrated hereafter. The starting ethylene dichloride ammonia polymers generally have a molecular weight range of 500–100,000. In a preferred embodiment the molecular weight is 1,500 to 10,000, with a most preferred molecular weight range being 1,500–5,000.

By way of example, and not limitation, the preparation of such polymers can be as set forth in Example 1.

EXAMPLE 1

To a pressure reactor were charged 10.8 weight percent aqueous ammonia, 7.7 weight percent anhydrous ammonia, 2.3 weight percent water and 0.3 weight percent EDTA. The reactor was sealed and heated to 115°–130° C. and the ethylene dichloride (EDC) was pumped in. After the addition of about 0.5 weight percent of EDC, 50 percent sodium hydroxide was added at about the same rate as the EDC and the additions were completed in 4.5 hours. Samples during the reactant addition were obtained. These samples were then concentrated under reduced pressure to remove residual EDC, $NH_3$ and vinyl chloride which is a by-product of the reaction. Weight average molecular weights of the polymers were then measured using a liquid chromatography method and polyethylene glycol standards. A series of polymers were prepared with their make-up and properties being set forth in Table 1.

TABLE 1

| Sample # | Wt % EDC | Wt % NaOH | Mw | Mn | Poly-dispersity | Polymer Solids |
|---|---|---|---|---|---|---|
| 1 | 12.9 | 10.4 | 1380 | 1010 | 1.3 | 41.2 |
| 2 | 15.4 | 12.3 | 1620 | 1100 | 1.5 | 46.4 |
| 3 | 17.5 | 15.2 | 1670 | 1100 | 1.5 | 41.9 |
| 4 | 20.2 | 19.3 | 1850 | 1290 | 1.6 | 43.1 |
| 5 | 22.3 | 23.1 | 2320 | 1290 | 1.8 | 37.8 |
| 6 | 24.7 | 25.7 | 2970 | 1440 | 2.0 | 47.1 |
| 7 | 26.7 | 27.4 | 3470 | 1540 | 2.2 | 41.5 |
| 8 | 29.2 | 29.2 | 4420 | 1700 | 2.6 | 42.5 |
| 9 | 32.1 | 32.8 | 6040 | 1910 | 3.1 | 37.9 |
| 10 | 33.8 | 34.6 | 7970 | 1910 | 4.2 | 36.5 |
| 11 | 36.3 | 42.6 | 92,100 | 2600 | 35.0 | 35.0 |

Following the preparation of the ethylene dichloride ammonia polymers, such polymers were modified with carbon disulfide. The reaction of polyamines or polyamines with carbon disulfide to produce dithiocarbamates or their salts is well known. Such reactions are described with specificity in U.S. Pat. No. 4,731,187 which is incorporated herein by reference. The reaction between polyamines and carbon disulfide is preferably conducted in a solvent, such as water or alcohol. The reaction proceeds smoothly between the temperature range of 30° to 100° C. for periods of time ranging between 1 and 10 hours. Good conversions are achieved when the temperature is between 40°–70° C. for 2 to 5 hours. These general reaction conditions apply to modifying the ethylene dichloride ammonium polymers described previously.

The mole percent of dithiocarbamate salt groups placed in the finished polymer, generally is within the range of 5 to 50 mole percent. In an embodiment, the range is 20–40 mole percent. In another embodiment, the range is about 25–30 mole percent.

By way of example, and not limitation, the conversion of the ethylene dichloride polymers to dithiocarbamate salt groups is set forth in Example 2 below.

EXAMPLE 2

To 82 gm of an EDC/NH3 polymer (Sample #6) were added 38 gm of 50 percent sodium hydroxide and 41 gm of D.I. water. The mixture was placed in a pressure reactor and 14 gm of carbon disulfide were added. The mixture was heated to 45°–50° C. for three hours. After the three hours reaction time, the mixture was cooled and a vacuum applied for 5 minutes to remove any residual carbon disulfide. The resulting solution product contained 30 percent modified polymer.

Using this preparative technique, the following modified polymers were prepared: (See Table 2)

TABLE 2

| Example | MW | Wt % Polymer | Wt % CS$_2$ | Mole % CS$_2$ | Wt % 50% NaOH | Comments Rxn Product |
|---|---|---|---|---|---|---|
| A | 2970 | 22.1 | 8.0 | 21 | 21.7 | Soluble |
| B | 2970 | 20.9 | 9.7 | 26 | 20.5 | Soluble |
| C | 2970 | 18.0 | 11.1 | 35 | 22.3 | Soluble |
| D | 3470 | 20.6 | 9.6 | 26 | 20.2 | Soluble |
| E | 3420 | 18.9 | 11.7 | 35 | 18.5 | Soluble |
| F | 4400 | 20.1 | 9.4 | 26 | 25.0 | Insoluble |
| G | 4092 | 22.0 | 8.0 | 21 | 17.1 | Insoluble |
| H | 4096 | 22.0 | 8.0 | 10 | 17.1 | Soluble |
| I | 1850 | 20.6 | 4.0 | 21 | 21.1 | Soluble |

As molecular weight increases the amount of carbon disulfide that can be reacted to form a water soluble reaction product decreases. With less than about 20 mole percent CS$_2$ in the polymer, metal removal efficiency decreases.

In use, the method of the present invention effectively removes monovalent as well as divalent metals. For example, metals that can be removed pursuant to the present invention are: copper; nickel; zinc; lead; mercury; cadmium; silver; iron; manganese; palladium; and platinum. Moreover, the present invention can be used to remove radioactive and nonradioactive metals.

The amount of modified polymer of the invention capable of effectively removing metals from contaminated waters varies depends upon the concentration and identity of the metal ion(s) in the waste water. A stoichiometric amount of the polymer relative to the amount of dissolved metal (stoichiometric amount x ppm of metal present) is added to the waste water to remove any non-chelated metal. By way of example, and not limitation, the following are approximate dosages required to remove 1ppm of the particular metal.

| Element | Product Dosage (ppm) |
|---|---|
| Copper | 11 |
| Nickel | 12 |
| Zinc | 11 |
| Lead | 3 |
| Mercury | 4 |
| Cadmium | 6 |
| Silver | 3 |

For strongly chelated waste waters, twice the stoichiometric amount of the polymer may be needed.

Dosage of modified polymer is preferably within the range of 0.2 to 2 moles of dithiocarbamate per equivalent wt. of metal. More preferably, the dosage is 1 to 2 moles of dithiocarbamate per equivalent wt. of metal contained in the water. These dosages have been demonstrated to produce excellent removal results.

According to one embodiment of the invention, the dosage of metal removal polymer required to chelate and precipitate 100 ml of 20 ppm soluble copper to about 1 ppm or less was 0,009 gm (9.0 mg) of polymer. The metal polymer complexes formed are self flocculating and quickly settle. These flocculants are easily separated from the treated water.

Prior to treating the waste water with the modified polymer (pDTC), preferably the pH of the waste water is raised to between 4 and 12. Polymeric dithiocarbamate (pDTC), like DTC, is unstable in water at low pH, decomposing to reform the raw materials used for its manufacture. Thus, in an embodiment, the method of the present invention includes the additional step of adjusting the pH of the fluid stream to between 4 and 12 prior to treating same with pDTC of the present invention.

By way of example, and not limitation, examples of the invention will now be given.

EXAMPLE 3

To illustrate the ability of the dithiocarbamate polymers set forth in Table 2 to effectively chelate and remove copper metal from a water supply, the following data is presented in Table 3:

TABLE 3

Residual Copper (ppm) from a Contaminated Water Supply
Polymer Dose mg/100 ml waste water

| Polymer | 0 | 6 | 9 | 12 | 15 | 18 |
|---|---|---|---|---|---|---|
| A | 20.0 |  | 1.1 | 0.09 | 0.05 |  |
| B | 20.0 | 3.9 | 0.2 | 0.07 | 0.07 | 0.05 |
| C | 20.0 | 3.1 | 0.2 | 0.06 | 0.05 | 0.05 |
| D | 20.0 | 3.4 | 0.1 | 0.06 | 0.04 | 0.04 |
| E | 20.0 | 2.2 | 0.11 | 0.06 | 0.06 | 0.06 |
| H | 20.0 |  | 0.14 | 0.08 | 0.08 |  |

All polymers were prepared as 0.3 weight percent polymer solutions in deionized water. Copper containing water was used for testing and prepared fresh on the day of testing.

Six 100 mL samples (jars) of waste water were placed in 150 mL beakers and set up on a gang stirrer. The samples of waste water were mixed at 100 rpm while the polymer was dosed into the samples. The dosages used were 1, 2, 3, 4, 5, and 6 mL of polymer solutions prepared as described above. The mixing at 100 rpm was continued for a total of 10 minutes. This was then followed by a slow mix (50 rpm) for 10 minutes. After the mixing was completed, the water samples were filtered through 0.45 micron filters. The filtrate was then acidified to pH=2 with concentrated nitric acid to stop any further precipitation of the copper.

Residual soluble copper was determined in the filtered water samples by atomic absorption analysis using copper standards for reference. One set of jars was run for each polymer tested. Duplicates for several polymers were run and confirmed the reported results.

It should be noted that the observed filtration rate was typically less than 1 minute for contaminated water treated with the polymer while the filtration rate for water treated with dimethyldithiocarbamate was typically greater than 2 minutes.

EXAMPLE 4

This experiment was designed to measure the benefits of the present invention. Additionally, the experiment shows the ability of this modified polymer to treat low level metals to ppb levels with filtration. Table 4 illustrates the results.

TABLE 4

| | Initial Cu Level = 2.74 ppm | |
|---|---|---|
| Chemical Dosages | Filter Pore Size, μM | Effluent Cu levels, ppm |
| 50 | 0.1 | 0.10 |
| 100 | 0.1 | 0.01 |
| 150 | 0.1 | <0.01 |
| 50 | 0.22 | 0.13 |
| 100 | 0.22 | 0.02 |
| 150 | 0.22 | 0.01 |
| 50 | 0.45 | 0.15 |
| 100 | 0.45 | 0.03 |

TABLE 4-continued

| Chemical Dosages | Initial Cu Level = 2.74 ppm | |
|---|---|---|
| | Filter Pore Size, μM | Effluent Cu levels, ppm |
| 150 | 0.45 | 0.01 |
| 50 | settled | 2.72 |
| 100 | settled | 0.20 |
| 150 | settled | 0.15 |
| 50 | settled (stir overnight) | 2.33 |
| 100 | settled (stir overnight) | 0.06 |
| 150 | settled (stir overnight) | 0.02 |

EXAMPLE 5

This experiment was designed to measure the benefits of the present invention. Additionally, the experiment compares the effect of treating waste water containing lead with the modified polymer of the present invention (pDTC) versus treating with DTC, a coagulant and a flocculent. The Pb values obtained are after filtering through a 0.45 μM membrane filter. Table 5 below illustrates the results.

TABLE 5

| Chemical | Initial Pb Levels, ppm | Final pb Levels, ppm |
|---|---|---|
| DTC | 1.03 | 0.29 |
| DTC | 1.78 | 0.36 |
| DTC | 0.87 | 0.18 |
| DTC | 1.22 | 0.24 |
| pDTC | 1.03 | <0.01 |
| pDTC | 0.99 | 0.03 |
| pDTC | 1.8 | <0.01 |
| pDTC | 1.01 | 0.02 |
| pDTC | 1.06 | <0.01 |
| pDTC | 0.69 | <0.01 |

As Examples 4 and 5 detail, after the waste water is treated with an effective amount of pDTC, the fluid stream is passed through a filtering device designed to capture the metal complexes. As those skilled in the art will appreciate, the filtering device may be positioned at an effective position along the waste water system. In addition, a multitude of filtering devices may be used to improve metal removal.

The present invention provides an effective method to remove settleable as well as nonsettleable solids. Settleable solids refers generally to solids (typically >10 microns in diameter) that settle unaided to the bottom of the container or sedimentation basis within 4 hours. The use of filtering devices pursuant to the present invention eliminates the need for extensive settling of metal complexes, thereby decreasing the time needed for effective collection. As a result, the present invention provides a more cost effective method of metal removal.

Unlike with prior methods, the present invention also collects nonsettleable solids. Nonsettleable solids refers generally to solids that do not settle in a reasonable time. For example, solids generally ranging in diameter from 0.001 to 10 microns are considered nonsettleable solids. In low metal containing water, the present invention thus provides an effective method to remove such nonsettleable solids that lack the solids needed to build floc size to settleable size.

As illustrated in Examples 4 and 5, the use of pDTC coupled with the filtering device, such as a filter, allows for the removal of metals to extremely low levels. The pDTC causes the formation of precipitate that can thereby be removed from the water stream. Moreover, the filtering devices assure the collection of all such formed precipitate, increasing the percentage of removed solids.

Filtering devices that may be used in the present invention include filters suitable for nanofiltration, ultrafiltration, microfiltration and particle filtration techniques. In an embodiment, a filter suitable for microfiltration techniques is utilized pursuant to the present invention. In preferred embodiments, suitable filtering devices are: a conventional sand filter; a mixed media filter; a membrane filter having pore size openings of 0.001 microns to 10 microns. Suitable filters can be obtained from any manufacturer of filter devices.

While the filtering devices can eliminate the need for solids settling, naturally allowing some degree of settling prior to filtration will further increase the effectiveness of the metal removal. Thus, in an embodiment, the method includes the additional step of allowing at least a majority of the metal complexes to settle from the fluid stream as a precipitate prior to passing the fluid stream through a filtering device.

The method of the present invention may be utilized in a variety of fluid systems. For instance, the present invention may be used to treat waste streams in the lead processing industry, metals from incidental corrosion, in boiler cleaning systems, and also in incinerator scrubber waters. Additionally, the present invention may be used to treat flue gas condensate containing metals, and to facilitate manganese and iron removal from process waters. Still further, the present invention may be used in the plating industry, in wastewaters from metal catalyzed processes, in cooling water blowdown, in alloying processes, in refining wastewaters, in ground water and in wastewater from the semiconductor industry.

It should be understood that various changes and modifications to the presently preferred embodiments described herein will apparent to those skilled in the art. Such changes and modifications can be made without departing from the spirit and scope of the present invention without diminishing its intended advantages. It is therefore intended that such changes and modifications be covered by the appended claims.

We claim:

1. A method for removing monovalent and divalent metals from a fluid stream containing these metals comprising the steps of:
   treating the fluid stream with a water soluble ethylene dichloride ammonia polymer having a molecular weight of from 500 to 100,000 that contains from 5 to 50 mole percent of dithiocarbamate salt groups to form complexes with the monovalent and divalent metals; and
   passing the fluid stream through a filtering device to remove the complexes from the fluid stream.

2. The method of claim 1 wherein the fluid is water.

3. The method of claim 1 wherein the metals are selected from the group consisting of: copper; nickel; zinc; lead; mercury, cadmium; silver; iron; manganese; palladium; and platinum.

4. The method of claim 1 wherein the metals are radioactive metals.

5. The method of claim 1 wherein the metals are nonradioactive metals.

6. The method of claim 1 including the further step of allowing at least a majority of the complexes to settle from the fluid stream as a precipitate prior to filtering the fluid stream.

7. The method of claim 1 including the further step of adjusting the pH of the fluid stream to between 4 and 12 prior to treating the fluid stream with the water soluble polymer.

8. The method of claim 1 wherein the filter is a sand filter.

9. The method of claim 1 wherein the filter is a mixed media filter.

10. The method of claim 1 wherein the filter is a membrane filter having pore size openings from 0.001 to 10 microns.

11. The method of claim 1 wherein the fluid stream is boiler cleaning waste.

12. The method of claim 1 wherein the fluid is a flue gas condensate containing the metals.

13. The method of claim 1 wherein the fluid is incinerator scrubber water.

14. The method of claim 1 wherein the water soluble polymer has a molecular weight from 1,500 to 5,000 and contains from 15-50 mole percent of dithiocarbamate salt groups.

15. The method of claim 1 wherein the water soluble polymer has a molecular weight from 1,500 to 5,000 and contains about 25-40% of dithiocarbamate salt groups.

16. A method for removing monovalent and divalent metals from a water stream containing these metals comprising the steps of:
   treating the water stream with a water soluble ethylene dichloride ammonia polymer having a molecular weight of from 500 to 100,000 that contains from 5 to 50 mole percent of dithiocarbamate salt groups to form complexes with the monovalent and divalent metals;
   allowing at least a portion of the complexes to settle from the water as a precipitate; and
   passing the water stream through a filter.

17. The method of claim 16 wherein the metals are selected from the group consisting of: copper; nickel; zinc; lead; mercury; cadmium; silver; palladium; and platinum.

18. The method of claim 16 wherein the filtering device is a membrane filter having pore size openings from 0,001 microns to 10 microns.

19. The method of claim 16 further including the step of adjusting the pH of the water stream to between 4 and 12 prior to treating the water stream with the water soluble polymer.

20. A method for removing monovalent and divalent metals from a water stream comprising the steps of:
   adding to the water stream a water soluble ethylene dichloride ammonia polymer having a molecular weight of from 500 to 100,000 that contains at least 5 mole percent of dithiocarbamate salt groups;
   allowing at least some of the monovalent and divalent metals located within the water stream to form complexes with the monovalent and divalent metals; and
   passing the water stream through a filtering device that prevents the complexes from passing therethrough, thereby removing the complexes from the water stream.

21. The method of claim 20 wherein the metals are selected from the group consisting of: copper; nickel; zinc; lead, mercury; silver; palladium and platinum.

22. The method of claim 20 further including the step of adjusting the pH of the water stream to between 4 and 12 prior to treating the water stream with the water soluble polymer.

23. The method of claim 20 wherein the filtering device is a membrane filter having pore size openings from 0,001 microns to 10 microns.

* * * * *